(12) United States Patent
Sano et al.

(10) Patent No.: US 7,825,911 B2
(45) Date of Patent: Nov. 2, 2010

(54) TOUCH SENSOR, TOUCH PAD AND INPUT DEVICE

(75) Inventors: Takeshi Sano, Takatsuki (JP); Keiichi Kuramoto, Kadoma (JP); Hiroyuki Fujii, Ritto (JP); Kenichiro Wakisaka, Iga (JP)

(73) Assignee: Sanyo Electric Co., Ltd. (JP)

( * ) Notice: Subject to any disclaimer, the term of this patent is extended or adjusted under 35 U.S.C. 154(b) by 795 days.

(21) Appl. No.: 11/727,255

(22) Filed: Mar. 26, 2007

(65) Prior Publication Data
US 2008/0100587 A1 May 1, 2008

(30) Foreign Application Priority Data
Mar. 27, 2006 (JP) ............................. 2006-086704

(51) Int. Cl.
G06F 3/041 (2006.01)
G06F 3/045 (2006.01)

(52) U.S. Cl. ................. 345/173; 345/174; 345/177; 178/18.01; 178/18.04; 178/18.05; 178/19.03

(58) Field of Classification Search ......... 345/173–179; 178/18.01–19.01
See application file for complete search history.

(56) References Cited

U.S. PATENT DOCUMENTS

| | | | | |
|---|---|---|---|---|
| 4,634,917 A | * | 1/1987 | Dvorsky et al. | 310/328 |
| 5,543,588 A | * | 8/1996 | Bisset et al. | 178/18.06 |
| 5,869,791 A | * | 2/1999 | Young | 178/20.01 |
| 7,215,330 B2 | * | 5/2007 | Rantet | 345/173 |
| 2003/0067448 A1 | * | 4/2003 | Park | 345/173 |
| 2003/0098858 A1 | * | 5/2003 | Perski et al. | 345/173 |
| 2004/0105040 A1 | * | 6/2004 | Oh et al. | 349/12 |
| 2006/0284858 A1 | * | 12/2006 | Rekimoto | 345/173 |
| 2007/0046642 A1 | * | 3/2007 | Lee et al. | 345/173 |

FOREIGN PATENT DOCUMENTS

JP 2003-196007 7/2003

* cited by examiner

*Primary Examiner*—David L Lewis
*Assistant Examiner*—Benyam Ketema
(74) *Attorney, Agent, or Firm*—NDQ&M Watchstone LLP

(57) ABSTRACT

A touch sensor includes a contact sensor and a pressure sensor. The contact sensor includes a first electrode and a first switching element connected to the first electrode, and detects a change in an electric potential when an object contacts a surface. The pressure sensor includes a second electrode and a second switching element connected to the second electrode, and detects a change in a pressure when an object depresses the surface. The touch sensor includes a plurality of the contact sensors and a plurality of the pressure sensors disposed regularly in an array.

11 Claims, 12 Drawing Sheets

FIG.11A
FIG.11B
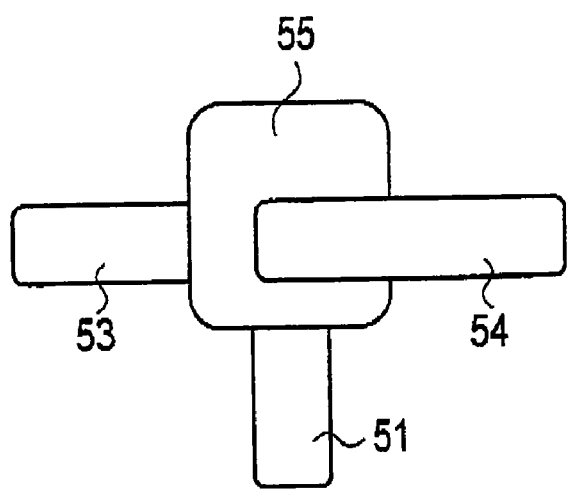
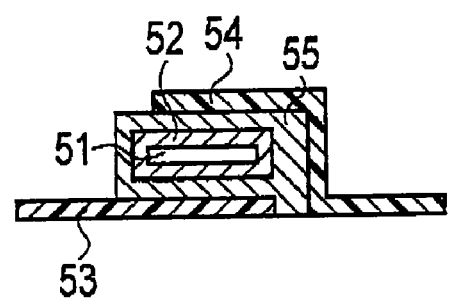

TOUCH SENSOR, TOUCH PAD AND INPUT DEVICE

CROSS REFERENCE TO RELATED APPLICATIONS

This application is based upon and claims the benefit of priority from prior Japanese Patent Application No.2006-086704, filed on Mar. 27, 2006; the entire contents of which are incorporated herein by reference.

BACKGROUND OF THE INVENTION

1. Field of the Invention

The present invention relates to a touch sensor, a touch pad and an input device.

2. Description of the Related Art

Conventionally, a touch pad, which detects the position of the touched surface and displays the position on a display when touched by the surface, has been known in general. As such a touch pad, there are two major types; a capacitance type used for a touch pad of a personal computer or the like, and a pressure sensitive type used in a gaming machine, a personal digital assistant (PDA) or the like (e.g., refer to Japanese Patent Publication No. 2003-196007).

In addition, a technique of a touch pad, which enables easy character input even when the surface area used for character input is small, has been disclosed. The above technique has been used for cellular phone, PDA or the like. (e.g., refer to Japanese Patent Publication No. 2003-196007).

However, even though the conventional touch pad can detect a movement in the x-y plane, it cannot additionally detect a depression in the z-direction. To be more specific, the capacitance type detects a change in a surface charge of a display panel by detecting a finger touching the display panel. The capacitance type also detects a change in a capacitance caused by a finger approaching an electrode and senses whether the finger touches the display panel or not. For the pressure sensitive type, a resistive film type is widely used. The resistive film type calculates the contacted position out of a resistance value when an upper and lower electrodes of a screen contact each other caused by a finger or the like pressing the screen. Hence, it has not been easy to discriminate, for example, between dragging and moving a cursor. For this reason, heretofore, a click button has been separately provided to a touch panel, and dragging operation is achieved by using the click button and the touch pad in combination.

SUMMARY OF THE INVENTION

A first aspect of the present invention is summarized as a touch sensor including a contact sensor and a pressure sensor. The contact sensor includes a first electrode and a first switching element connected to the first electrode, and detects a change in an electric potential when an object contacts a surface. The pressure sensor includes a second electrode and a second switching element connected to the second electrode, and detects a change in a pressure when an object depresses a surface. A plurality of the contact sensors and a plurality of the pressure sensors are disposed regularly in an array.

According to the touch sensor of the first aspect, a movement on an x-y plane and a depression in the direction of a z-axis can be detected.

In addition, in the touch sensor of the first aspect, it is preferable that each of the first switching element and the second switching element is an organic transistor, respectively.

A second aspect of the present invention is summarized as a touch pad including a contact sensor, a pressure sensor and a control signal processor. The contact sensor detects a contact with an object on the surface of a specific face. The pressure sensor detects a depression by an object on the surface of the specific face. The control signal processor generates a control signal based on a position detected by the contact sensor and a state the detected position has been in contact, or based on a position detected by the pressure sensor and a state the detected position has been detected. The control signal processor then sends the control signal to an external device.

A third aspect of the present invention is summarized as an input device including a contact sensor, a pressure sensor, a control signal processor and a display. The contact sensor detects a contact with an object on a surface of a specific face. The pressure sensor detects a depression by an object on the surface of the specific face. The control signal processor generates a control signal based on a position detected by the contact sensor and a state the detected position has been in contact, or based on a position detected by the pressure sensor and a state the detected position has been depressed. The display outputs information in response to the control signal. The information corresponds to the position detected by the contact sensor or the position detected by the pressure sensor.

In addition, according to the input device of the third aspect, the position detected by the contact sensor and the position detected by the pressure sensor may correspond to keys.

The input device of the third aspect may further include an input unit in which a plurality of keys are disposed. According to the input device of the third aspect, the contact sensor and the pressure sensor may be disposed on the input unit.

The input device of the third aspect may further include an elastic member which is disposed corresponding to the plurality of keys.

Furthermore, according to the input device of the third aspect, the contact sensor and the pressure sensor may be disposed on the display.

BRIEF DESCRIPTION OF THE DRAWINGS

FIG. 11A is a top view of an organic transistor used for a touch sensor of a modified embodiment, and FIG. 11B is a sectional view of the modified embodiment.

DETAILED DESCRIPTION OF THE PREFERRED EMBODIMENTS

Figure 1:
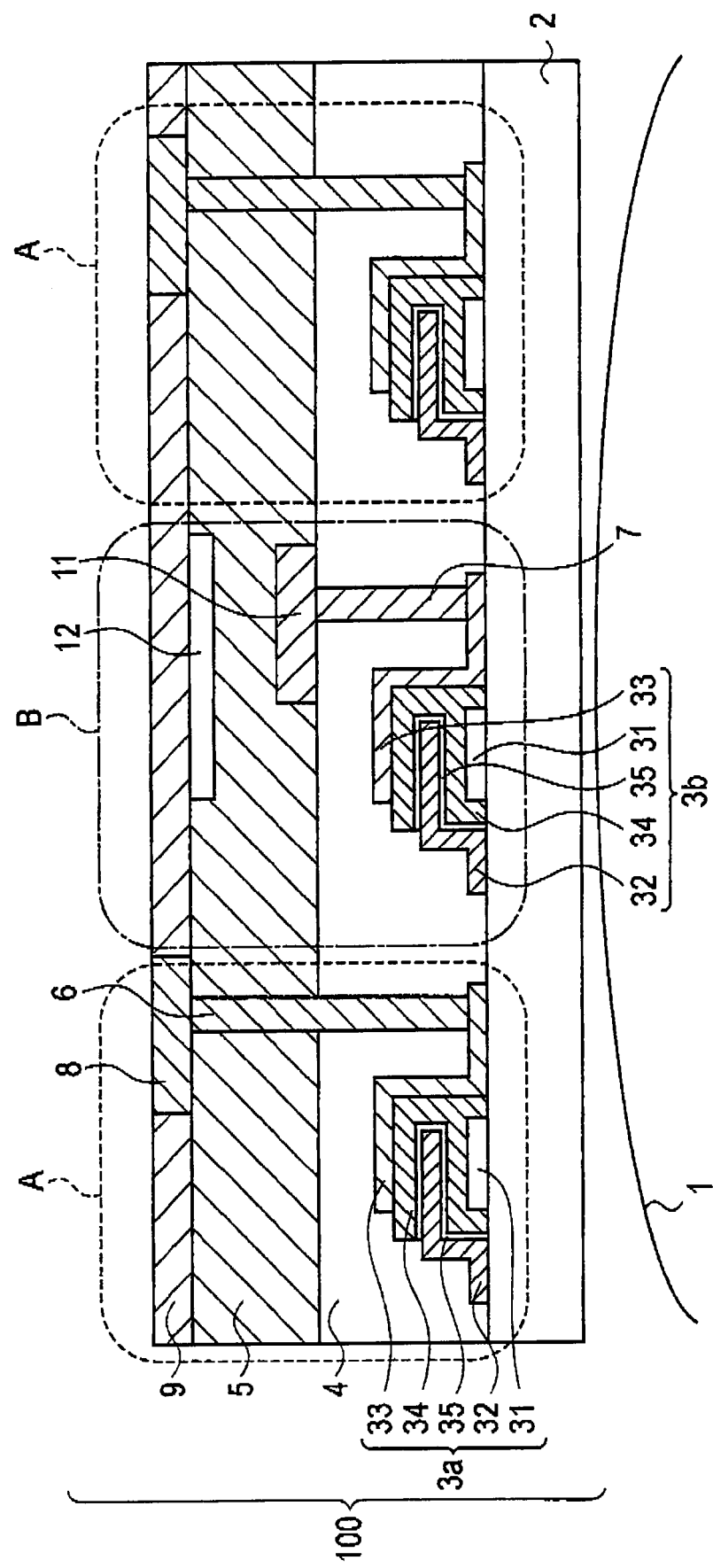
FIG. 1 is a sectional view of a touch sensor of an embodiment.

Next, an embodiment of the present invention is described with reference to the drawings. In the following description and drawings, the same or similar components are designated by the same or similar reference numerals. It should be noted that the drawings are schematic. Accordingly, sizes, ratios and the like are different from actual ones. For this reason, specific dimensions and the like should be determined in consideration of the following description. In addition, some of the sizes or ratios are different among the drawings.

(Touch Sensor)

A touch sensor 100 of the present invention includes contact sensors A and pressure sensors B, as shown in FIG. 1. Each of the contact sensors A detects a change in electric potential when an object contacts a surface. Each of the pressure sensors B detects a change in a pressure when an object depresses a surface. Here, the "object" indicates, for example, a part of a human body such as a finger or a hand, or an apparatus such as a stylus. In addition, a plurality of the contact sensors A and a plurality of the pressure sensors B are disposed regularly in an array.

Each of the contact sensors A includes a flexible substrate 2, an organic transistor 3a disposed on the flexible substrate 2, an dielectric 4, a piezoelectric 5, a contact part 6, an electrode 8 and a dielectric 9.

For the flexible substrate 2, a thin film made of polyethylene naphthalate (PEN) or the like is used. In addition, it may use a glass substrate, or a plastic substrate made of polyethylene terephthalate (PET), polycarbonate (PC), polyether sulfone (PES), polymethyl methacrylate (PMMA), polyimide (PI) or the like. Further, it may also use a metallic substrate made of stainless or aluminum, having a surface coated with an insulating film by using a polymer, an inorganic insulating material or the like.

The organic transistor 3a is a thin-film transistor, which includes a first electrode (a source electrode) 31, a second electrode (a gate electrode) 32, a third electrode (a drain electrode) 33 and an organic semiconductor layer 34. Moreover, for each of the first electrode 31, the second electrode 32 and the third electrode 33, a metal such as aluminum, gold, chromium, molybdenum, copper, tantalum or nickel; a metal alloy (another metal may also be used); or the like is used. Moreover, by using a transparent oxide conductive film such as ITO, IZO and $SnO_2$, it becomes easier to view a display in the case where the display and the sensor work at the same time. Furthermore, by using a conductive polymeric material such as polythiophene or polyaniline, or the like, a process with low costs such as a printing process can be applied. As a result, an innovative device with low manufacturing costs can be achieved.

Moreover, a lower part of the organic semiconductor layer 34 is formed through vapor deposition, an ink jet method, printing, spin coating, slit coating or the like. Thereafter, the second electrode 32 is formed. Then, an upper part of the organic semiconductor layer 34 is farther formed through vapor deposition, an ink jet method, printing, spin coating, slit coating and the like. Thereafter, the second electrode 32 is formed. This makes a structure that the second electrode 32 is buried in layers of the organic semiconductor layer 34.

An insulating film 36, which insulates the second electrode 32 from the organic semiconductor layer 34, may be formed of a material, such as an oxide, a nitride, an oxynitride and the like of silicon, aluminum, tantalum, titanium, hafnium, lead, zirconium or the like. It may also use an insulating polymeric material such as polyethylene naphthalate (PEN), polyethylene, polypropylene, polyethylene terephthalate (PET), polycarbonate (PC), polyether sulfone (PES), polymethyl methacrylate (PMMA), polyimide (PI), parylene, polyvinylphenol (PVP) and the like.

For the organic semiconductor layer 34, an organic semiconductor material having a carrier mobility of holes or electrons of not less than $10^{-5}$ cm/Vs may be used. For example, pentacene, rubrene, perylene derivatives, fullerene, carbon nanotubes, oligothiophenes, polythiophenes, materials containing thiophene condensed ring, acene materials, materials containing phenylamine, materials containing phthalocyanine and the like may be used. It is preferable to use an organic semiconductor material having a carrier mobility of holes or electrons of not less than $10^{-2}$ cm/Vs, for example, pentacene, rubrene, perylene derivatives, fullerene, carbon nanotubes, oligothiophenes and the like. In addition, the organic semiconductor layer 34 has 50 nm to 100 nm thick.

A part of the second electrode 32 is buried in the organic semiconductor layer 34 The buried part has a structure sequentially forming ultra-thin films each having 20 nm thick, or a structure having a stripe shape or a grid shape, or a structure having a large number of holes. The total thickness of the part of the second electrode 32 is 40 nm to 300 nm.

Each of the dielectrics 4 and 9 is formed of an organic dielectric material such as polyimide.

For the piezoelectric 5, any one of an inorganic piezoelectric material and an organic piezoelectric material may be used. As such an inorganic piezoelectric material, there are barium titanate, a lead zirconate-lead titanate solid solution and the like. However, the material is not limited to those described above. As an organic piezoelectric material, there are polyvinylidene fluoride and copolymer thereof. However, the material is not limited to those described above. In addition, the piezoelectric 5 is formed by means of a casting method or a sol-gel method.

The contact part 6 is formed as an electric contact part by forming a contact hole using laser processing, photolithography or the like, and by then forming an electric material.

The electrode 8 is electrically connected to the third electrode 33 via the contact part 6. It should be noted that the contact part 6 may be formed in a contact hole at the same time as the electrode 8 is formed, so that the electrode 8 is electrically connected to the third electrode 33. When a part of a human body such as a finger, a pen or the like having conductivity approaches or contacts a surface of the electrode 8, electric current provided from a power supply voltage (not shown) flows from the detection electrode to the human body or the conductive material and then the flowing current is detected. Incidentally, the detection electrode may be exposed on the surface of the sensor, or may be covered with a thin insulating film so as to form a capacitor structure capable of sensing of charging or discharging electric charges. In addition, in a case where the power supply voltage is 10 V, about 10 μA output can be obtained as an output of the organic transistor 3a.

The pressure sensor B includes the flexible substrate 2, an organic transistor 3b disposed on the flexible substrate 2, the dielectric 4, the piezoelectric 5, a contact part 7, the dielectric 9, and electrodes 11 and 12

The flexible substrate 2, the dielectric 4 and the dielectric 9 are substantially the same as those of the contact sensor A. Therefore descriptions thereof are omitted.

The organic transistor 3b is a thin film transistor which includes the first electrode 31, the second electrode 32, the third electrode 33 and the organic semiconductor layer 34. The first electrode 31, the second electrode 32, the third electrode 33 and the organic semiconductor layer 34 are the same as those of the organic transistor 3a. Therefore descriptions thereof are omitted.

A constitution of the piezoelectric 5 is substantially the same as that of the contact sensor A, therefore a description thereof is omitted. A lower-part pressure sensitive electrode 11 is formed on a lower part of the piezoelectric 5, and an upper-part pressure sensitive electrode 12 is formed on ann upper part of the piezoelectric 5. The lower-part pressure sensitive electrode 11 and the upper-part pressure sensitive electrode 12 are formed by vapor depositing an electrode material selected from a group consisting of gold, aluminum, silver, copper and nano-carbon.

The contact part 7 is formed as an electric contact part by forming a contact hole using laser processing, photolithography or the like and by then forming an electric material.

The lower-part pressure sensitive electrode 11 is electrically connected to the third electrode 33 via the contact part 7. It should be noted that the contact part 7 may be formed in a contact hole at the same time as the electrode 11 is formed, so that the electrode 11 is electrically connected to the third electrode 33. When a surface of the dielectric 9 is depressed by an object, a voltage is generated between the lower-part pressure sensitive electrode 11 and the upper-part pressure sensitive electrode 12 by the piezoelectric 5 which generates a charge in response to a pressure. Due to the voltage, a difference in potential between the electrodes 38 and 31, and thereby the depression can be detected as an electric current flowing from a power supply voltage. In the case where the power supply voltage is 10 V, about 10 μA can be obtained as an output of the organic transistor 3b.

As will be described later, the touch sensor 100 is disposed, for example, on an input unit of an input device where a plurality of keys is disposed An elastic body 1 is disposed so as to correspond to the plurality of keys. The elastic body 1 is deformed by a predetermined stroke (e.g., 0.4 mm) when being pushed with a force of 10 gram-weight. As a result, a feeling of clicking can be given to a user. As the elastic body 1, for example, plate springs, springs, rubber on which a conductive material is applied, and the like, may be used.

Figure 2:
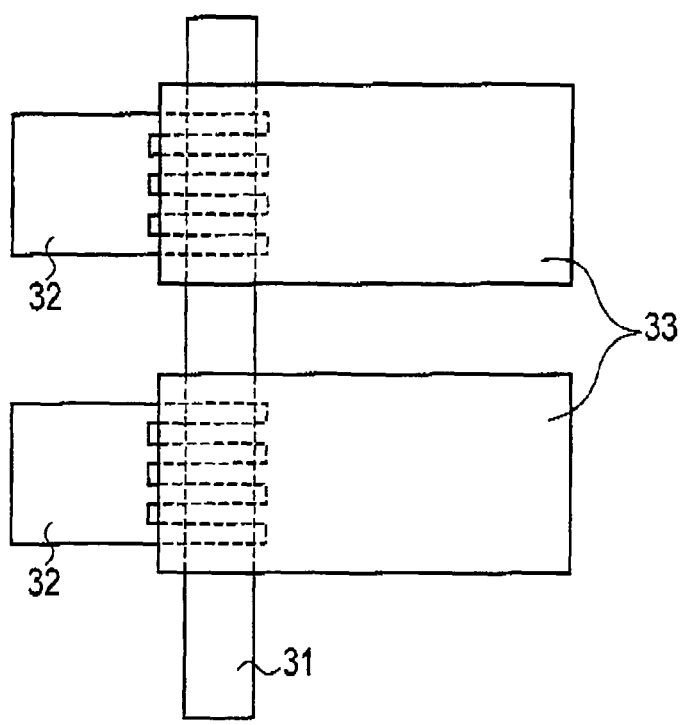
FIG. 2 is a top view of the touch sensor of the embodiment.

FIG. 2 shows a top view of the organic transistor 3a and the organic transistor 3b. As shown in FIG. 2, the second electrode 32 may be formed so as to have a comb-like structure.

It is preferable that each of the contact sensors A and the pressure sensors B has a size of 50 μm to 10 mm. However, the range of the size is not necessarily limited to this, and not necessarily has a square shape or a rectangular shape. Moreover, it is preferable that, when a cellular phone is used as an input device 200, the size of each of the contact sensors A and the pressure sensors B is of about 500 μm in order to achieve the arrangement of the appropriate number of sensors per practical unit area for practical use.

(Input Device)

Figure 3:
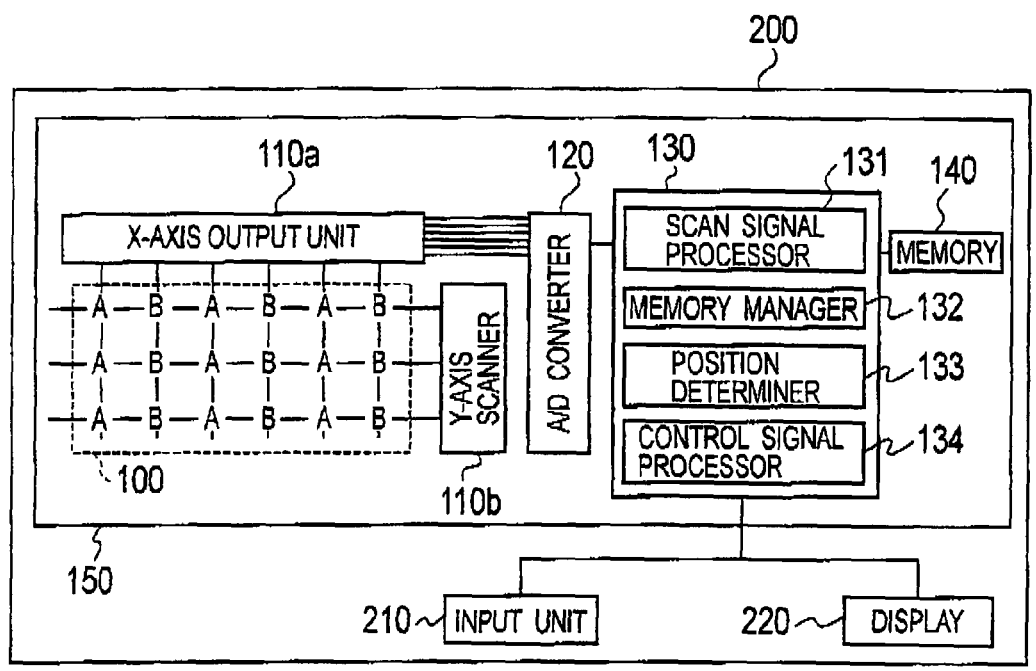
FIG. 3 is a block diagram for showing a constitution of an input device of an embodiment.

Next, an input device according to the present embodiment is described. As shown in FIG. 3, an input device 200 according to the present embodiment includes a touch pad 150, an input unit 210 and a display 220.

The touch pad 150 includes the forgoing touch sensor 100, an X-axis output unit 110a, a Y-axis scanner 110b, an A/D converter 120, and a CPU 130 and a memory 140.

The touch sensor 100 includes contact sensors A and pressure sensors B. Each of the contact sensors A detects, in a specific face, that an object contacts a surface of the specific face. Each of the pressure sensors B detects, in the specific face, that an object depresses a surface of the specific face. As shown in FIG. 3, a plurality of the contact sensors A and a plurality of the pressure sensors B are disposed regularly in an array. Incidentally, the contact sensors A and the pressure sensors B are alternately disposed in the right-and-left direction in FIG. 3. These sensors may be alternately disposed in the up-and-down direction. Incidentally, these sensors may be alternately disposed not only in the right-and-left direction but also in the up-and-down direction, or may be disposed in another pattern.

The X-axis output unit 110a and the Y-axis scanner 110b scans the Y-axis at timing when a gate is set to ON by means of a normal matrix scanning method. Then, the result of the scanning is sent from the X-axis output unit 110a to the A/D converter 120 as a voltage corresponding to the result of the detected current.

The A/D converter 120 converts the voltage received from the X-axis output unit 110a into a digital signal.

The CPU 130 performs various processes based on digital signals received from the A/D converter 120. In addition, the CPU 130 includes a scan signal processor 131, a memory manager 132, a position determiner 133 and a control signal processor 134.

The scan signal processor 131 receives a digital signal from the A/D converter 120.

The memory manager 132 stores a result of scanning performed by the X-axis output unit 110a and the Y-axis scanner 110b in a memory 140. Then the memory manager 132 compares the scanning result with a memory value stored last time. In the case where the scanning result is different from the memory value stored last time, the memory manager 132 determines that any of the sensors has detected a displacement. It should be noted that the memory manager 132 does not necessarily perform the storing operation into the memory 140 and the comparing operation. The memory manager 132 may determine that a sensor has detected, when the scan signal processor 131 receives a digital signal.

The position determiner 133 determines a position of the sensor from which a signal has been received among positions of the contact sensors A and the pressure sensors B disposed in the array. That is, the position determiner 133 determines a position of sensor which detects a displacement. Moreover, the position determiner 133 determines which one of the contact sensor A or the pressure sensor B has detected the displacement, or whether or not both of the sensors A and B have detected the displacement.

The control signal processor 134 generates a control signal on the basis of a position detected by the contact sensor A and a state the detected position has been in contact. Or, the control signal processor 134 generates a control signal on the basis of a position detected by the pressure sensor B and a state the detected position has been depressed. Moreover, the control signal processor 134 sends the control signal to an external device such as the display 220. A specific description of the control signal will be given along with descriptions of an operation of an input device.

The input unit 210 indicates a device such as a keyboard provided with a plurality of keys, a mouse or the like. Positions detected by the contact sensors A and the pressure sensors B correspond to the keys. Incidentally, when the input unit 210 performs an input operation, corresponding key information is transmitted to the CPU 130.

The display 220 indicates a screen of a monitor or the like. It is able to use a liquid crystal display (LCD), a light-emitting diode (LED) panel, an electroluminescence (EL) panel, an electronic paper display, an organic electroluminescence panel, a cathode-ray tube display, a field emission display and the like for such a display. Moreover, the display 220 outputs information corresponding to a position detected by the contact sensor A or a position detected by the pressure sensor B, in response to a control signal from the control signal processor 134.

Incidentally, the contact sensors A and the pressure sensors B may be disposed on the input unit 210 or on the display 220.

(Example of Using Touch Sensor)

Figure 4:
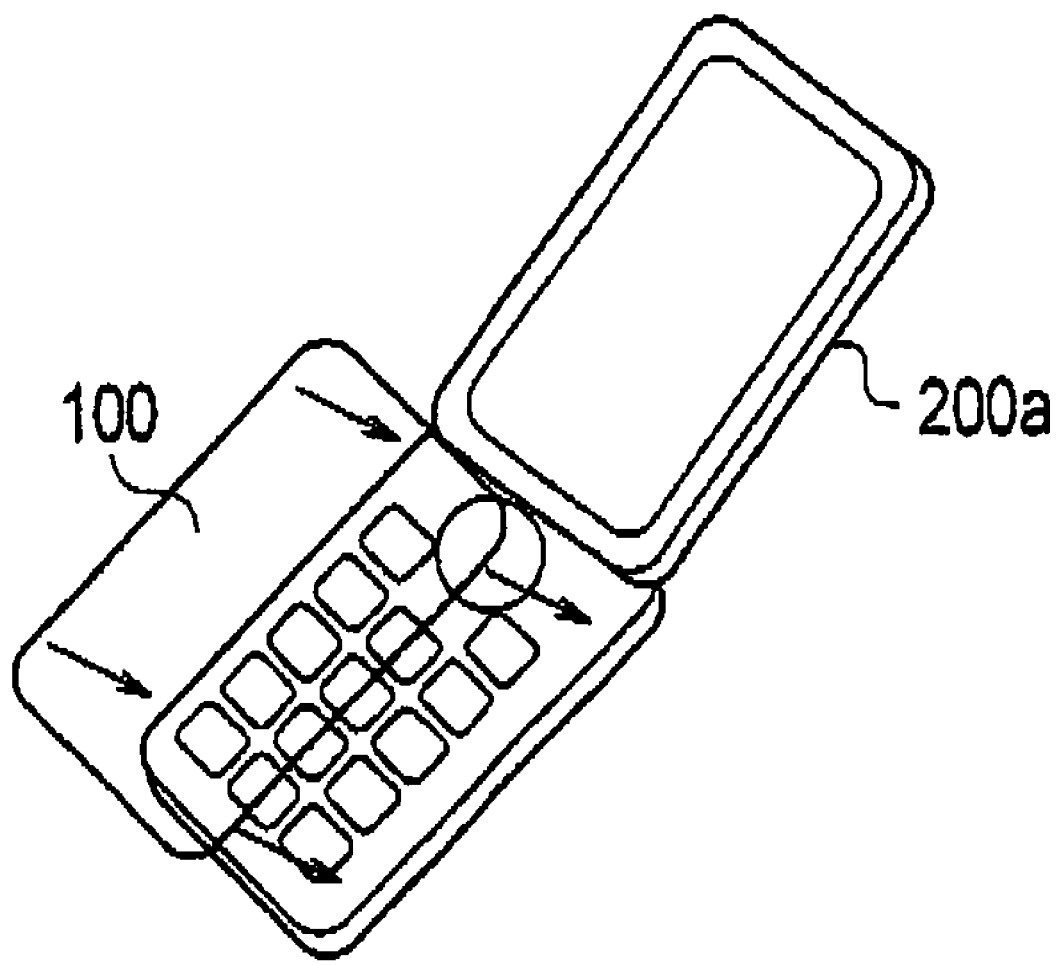
FIG. 4 is an example of use of the touch sensor of an embodiment.
Figure 5A:
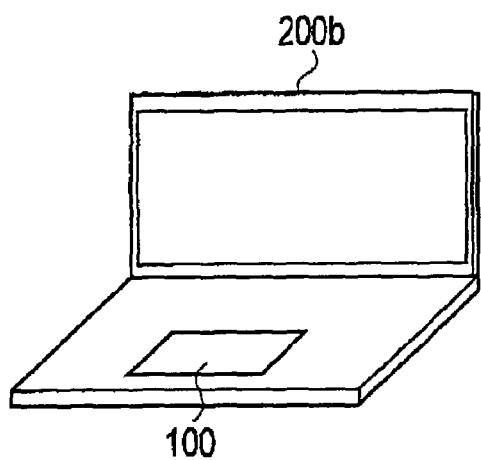
FIGS. 5A to 5D are examples of use of the touch sensor of an embodiment.
Figure 5B:
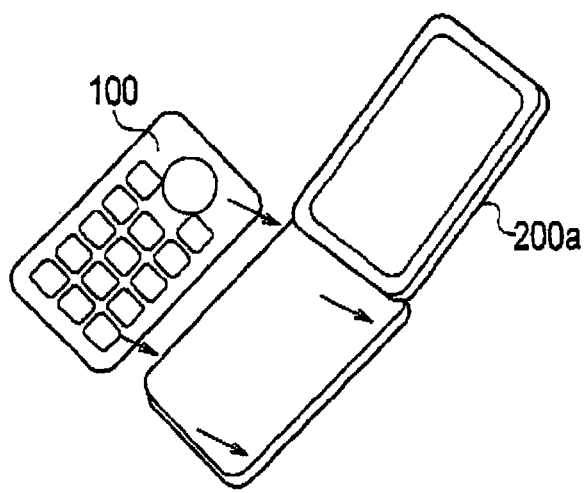
Figure 5C:
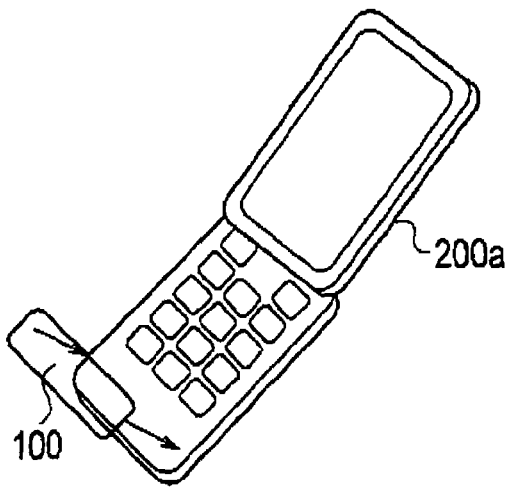
Figure 5D:
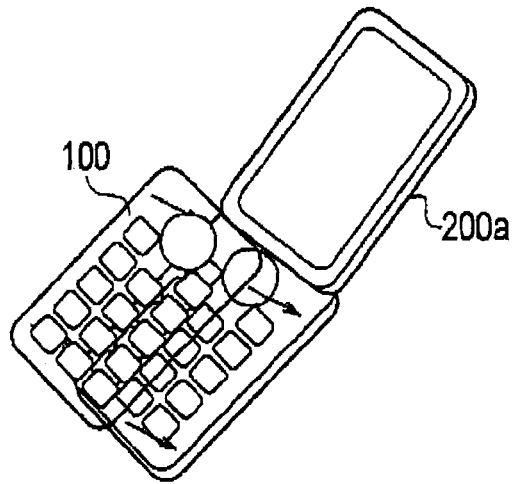
Figure 6:
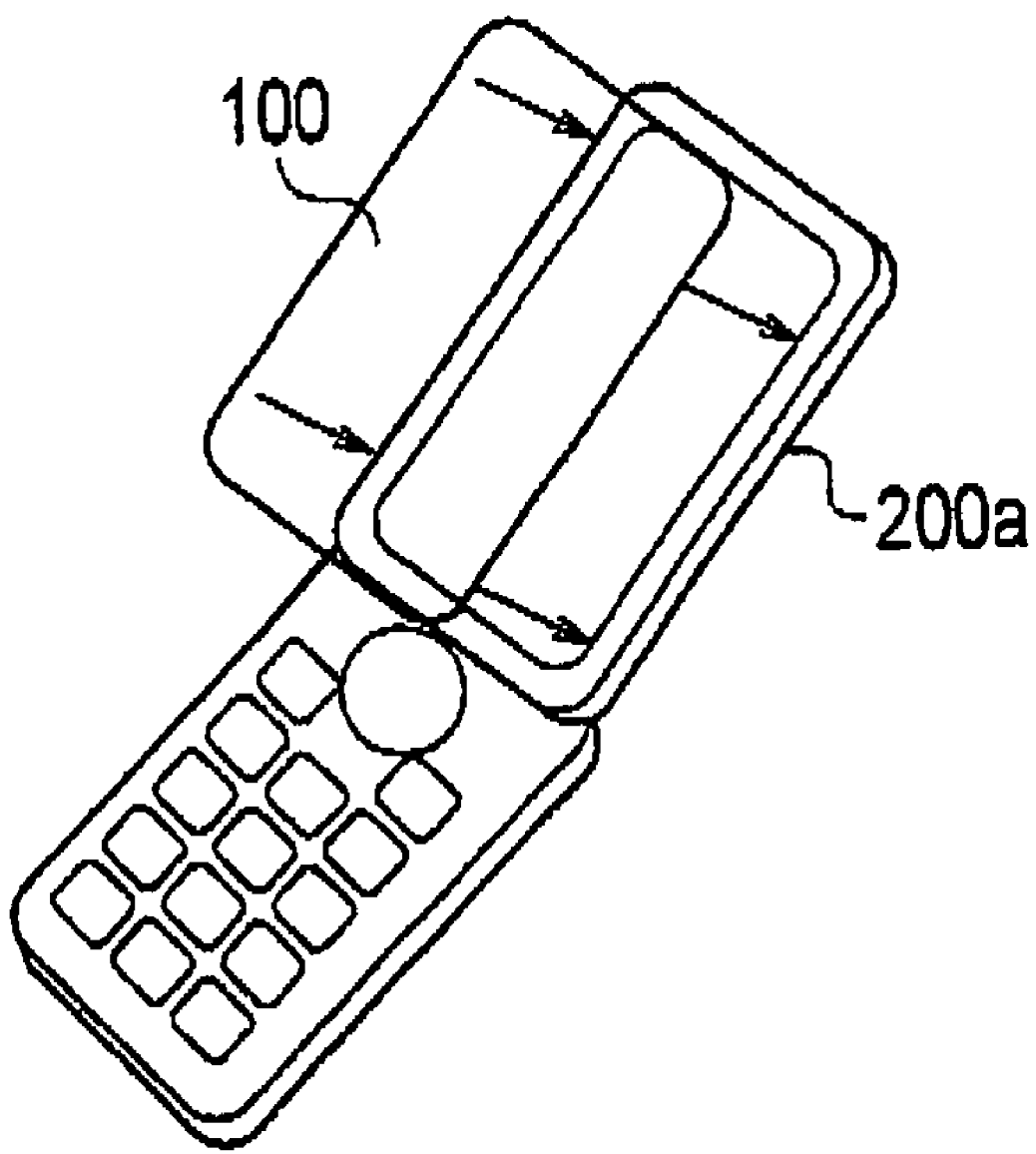
FIG. 6 is an example of use of the touch sensor of an embodiment.

As shown in FIGS. 4 to 6, an input device 200 of the present embodiment configures a sheet-like touch sensor 100 attached thereon.

FIG. 4 shows an example of an arrangement in which the sheet-like touch sensor 100 is disposed on a numeric keypad of a cellular phone 200a in an overlapping manner.

In addition, each of FIGS. 5A to 5D shows an example of an arrangement in which a sheet-like touch sensor 100 is disposed on a cellular phone 200a or on a notebook computer 200b in an overlapping manner. In FIG. 5A, a sheet-like touch sensor 100 is disposed on the notebook computer 200b in the overlapping manner, and is used as an x-y-z touch pad. In FIG. 5B, a sheet-like touch sensor 100 on which a numeric keypad is printed is disposed on the cellular phone 200a. In FIG. 5C, a sheet-like touch sensor 100 is disposed on a portion different from that of a numeric keypad, of the cellular phone 200a. In FIG. 5D, a sheet-like touch sensor 100 which has openings made thereon corresponding to a numeric keypad is disposed on the cellular phone 200a.

Moreover, FIG. 6 shows an example of an arrangement in which a sheet-like touch sensor 100 is disposed on a display of a cellular phone 200a. Note that the sheet-like touch sensor 100 is disposed on the display of the cellular phone 200a in FIG. 6, but the arrangement is not limited to this. A sheet-like touch sensor 100 may be disposed on a display of a personal computer (PC), a personal digital assistance (PDA), a general-purpose terminal or the like. In addition, in the case of FIG. 6, by linking the inputting of the touch sensor 100 with the displaying of the display, more effective input can be performed. Furthermore, by disposing the sensors on the display, it is possible to easily apply the sensors to a small-sized input device having little extra space.

In the case of FIGS. 4 and 6, it is necessary to provide a transparent portion to the touch sensor 100. For example, by using a transparent electrode as an electrode portion, the transmission of light is secured, thereby a display can be more easily viewed. It should be noted that, with respect to the prevention of a malfunction, a light blocking portion of a metal film or the like is preferably provided on a channel portion of an organic transistor, for the purpose of preventing light from a luminescent display from directly entering an active layer of the transistor. Moreover, for a bus line, a resistance value can be decreased by using a metal electrode, or by using a metal electrode along with a transparent electrode. Accordingly, a highly reliable device can be manufactured.

(Modification)

Next, a modification of a structure of an organic transistor is described. FIG. 1 shows a structure of the organic transistor. However, a structure of an organic transistor of the present embodiment is not limited to the one shown in FIG. 1, and various organic transistors can be used as shown in FIGS. 7 to 11.

Figure 7A:
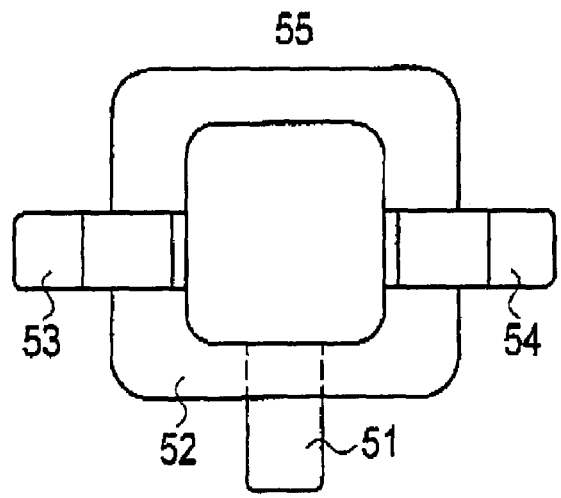
FIG. 7A is a top view of an organic transistor used for a touch sensor of a modified embodiment.
Figure 7B:
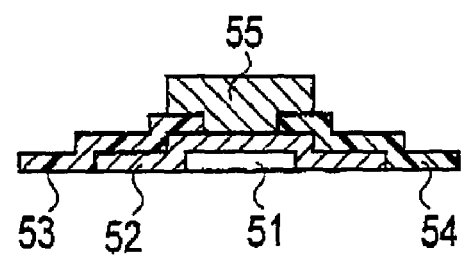
FIG. 7B is a sectional view of the modified embodiment.

An organic transistor shown in FIGS. 7A and 7B is a bottom-contact/bottom-gate organic transistor that includes a gate insulating film 52 formed on a gate electrode 51; a source electrode 53 and a drain electrode 54 formed respectively on both ends of the gate insulating film 62; and an organic semiconductor layer 55 formed on the gate insulating film 52, the source electrode 53 and the drain electrode 54.

Figure 8A:
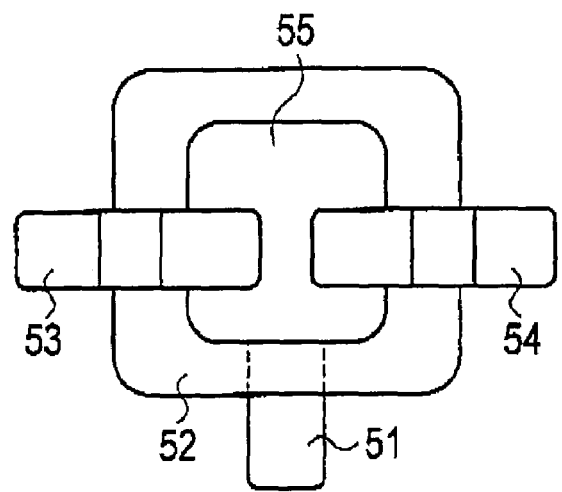
FIG. 8A is a top view of an organic transistor used for a touch sensor of a modified embodiment.
Figure 8B:
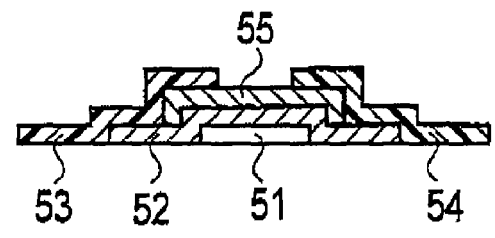
FIG. 8B is a sectional view of the modified embodiment.

An organic transistor shown in FIGS. 8A and 8B is a top-contact/bottom-gate organic transistor that includes a gate insulating film 52 formed on a gate electrode 51; an organic semiconductor layer 55 formed on the gate insulating film 52; and a source electrode 53 and a drain electrode 54, which are spaced from each other, and which are formed on the gate insulating film 52 and the organic semiconductor layer 55.

Figure 9A:
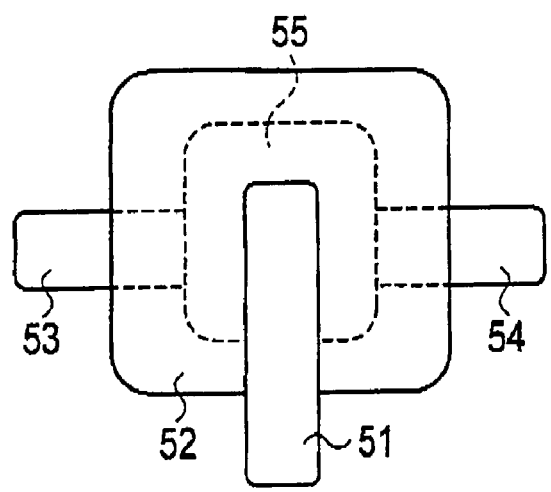
FIG. 9A is a top view of an organic transistor used for a touch sensor of a modified embodiment.
Figure 9B:
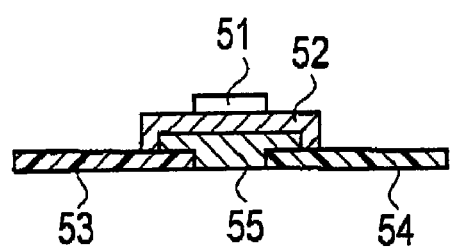
FIG. 9B is a sectional view of the modified embodiment.

An organic transistor shown in FIGS. 9A and 9B is a bottom-contact/top-gate organic transistor that includes a source electrode 53 and a drain electrode 54, which are formed so as to be spaced from each other; an organic semiconductor layer 55 formed on and between the source electrode 53 and the drain electrode 54; a gate insulating film 52 formed on the organic semiconductor layer 55, the source electrode 53 and the drain electrode 54; and a gate electrode 51 formed on the gate insulating film 52.

Figure 10A:
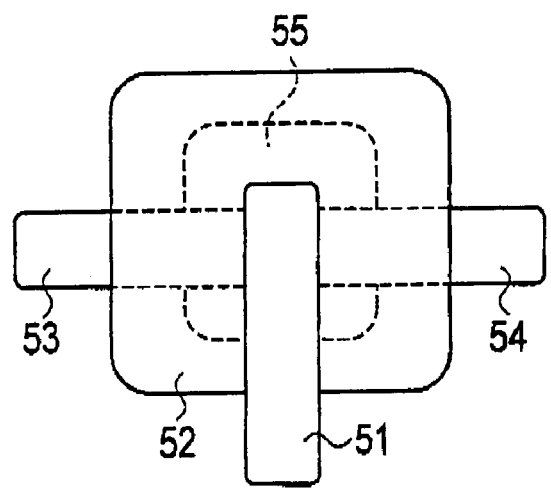
FIG. 10A is a top view of an organic transistor used for a touch sensor of a modified embodiment.
Figure 10B:
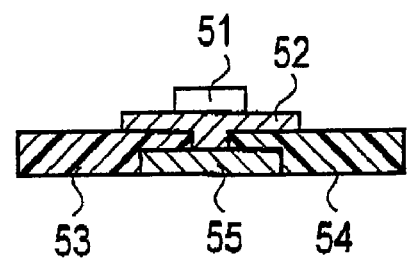
FIG. 10B is a sectional view of the modified embodiment.

An organic transistor shown in FIGS. 10A and 10B is a top-contact/top-gate organic transistor that includes a source electrode 53 and a drain electrode 54 formed on an organic semiconductor layer 55 so as to be spaced from each other; a gate insulating film 52 formed on the organic semiconductor layer 55, the source electrode 53 and the drain electrode 54; and a gate electrode 51 formed on the gate insulating film 52.

An organic transistor shown in FIGS. 11A and 11B is a vertical organic transistor that includes an organic semiconductor layer 55 formed on a source electrode 53; a drain electrode 54 formed on the organic semiconductor layer 55; and a gate electrode 51 formed so as to be entirely covered with a gate insulating film 52, in the organic semiconductor layer 55. Incidentally, the gate insulating film 52 may be disposed only on both sides of the gate electrode 51.

Figure 12:
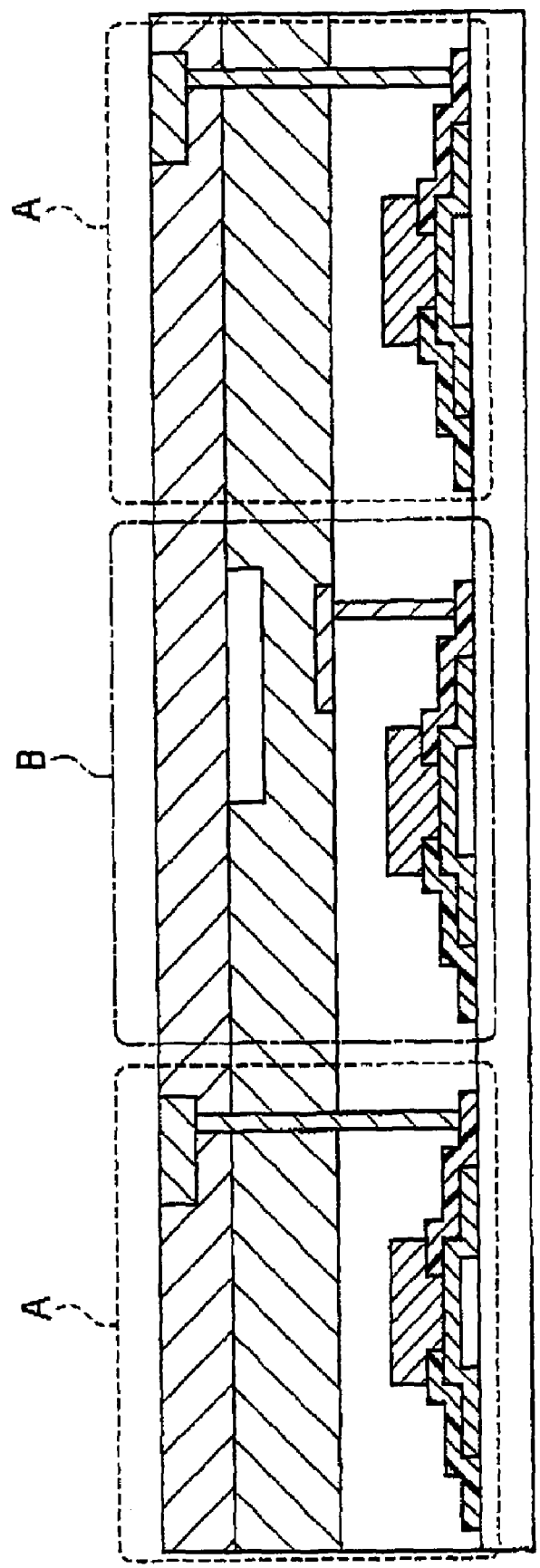
FIG. 12 is a sectional view of a touch sensor when using the organic transistor shown in FIG. 7.

FIG. 12 shows an example in which the bottom-contact/bottom-gate type transistor shown in FIG. 7 is applied to the contact sensors A and the pressure sensors B of the present embodiment.

(Operations of an Input Device)

Next, operations of an input device of the present embodiment are described with reference to FIG. 13.

First, in Step S101, the X-axis output unit 110a and the Y-axis scanner 110b scan the contact sensors A and the pressure sensors B in the directions of X-axis and Y-axis. Here, it is assumed that the contact sensors A and the pressure sensors B are alternately disposed in an array of m rows by n columns.

In Step S103, when the X-axis output unit 110a and the Y-axis scanner 110b receive a voltages outputted from any one of the contact sensors A and the pressure sensors B, the process goes to Step 104. When the X-axis output unit 110a and Y-axis scanner 110b do not receive a voltage, the process returns to Step S101. In addition, in Step S103, the A/D converter 120 converts the voltage received from the X-axis output unit 110a and the Y-axis scanner 110b into a digital signal. The scan signal processor 131 receives the digital signal from the A/D converter 120. The position determiner 133 determines of which position a sensor has been detected a displacement among positions where the contact sensors A and the pressure sensors B are disposed in an array of m rows by n columns.

Next, in Step S104, the position determiner 133 determines whether or not a pressure sensor B has detected the displacement. When the pressure sensor B has detected, the process goes to Step S105. In Step S105, the position determiner 133 determines whether or not a contact sensor A has detected the displacement. When the contact sensor A has detected, the process goes to Step S107, and when the contact sensor A has not detected, the process goes to Step S108.

Meanwhile, in Step S104, when the pressure sensor B has not detected the displacement, the process goes to Step S106. When the contact sensor A has detected the displacement, the process goes to Step S109.

In Step S107, the control signal processor 134 generates a control signal, on the basis of a position detected by the contact sensor A and a state that the detected position has been in contact, and on the basis of a position detected by the pressure sensor B and a state that the detected position has been depressed. As the control signal at this time, for example, a selection (a clicking) of an icon displayed on a display, an input process and the like are given.

In Step S108, the control signal processor 134 generates a control signal, on the basis of a position detected by the pressure sensor B and a state that the detected position has been depressed. As a control signal at this time, for example, a handwritten input, a dragging (moving while pressing), a drop (an operation in which pressure is turned from ON to OFF) and the like are given.

In Step S109, the control signal processor 134 generates a control signal, on the basis of a position detected by the contact sensor A and a state that the detected position has been in contact. As a control signal at this time, for example, a moving of a cursor and the like are given.

Figure 13:
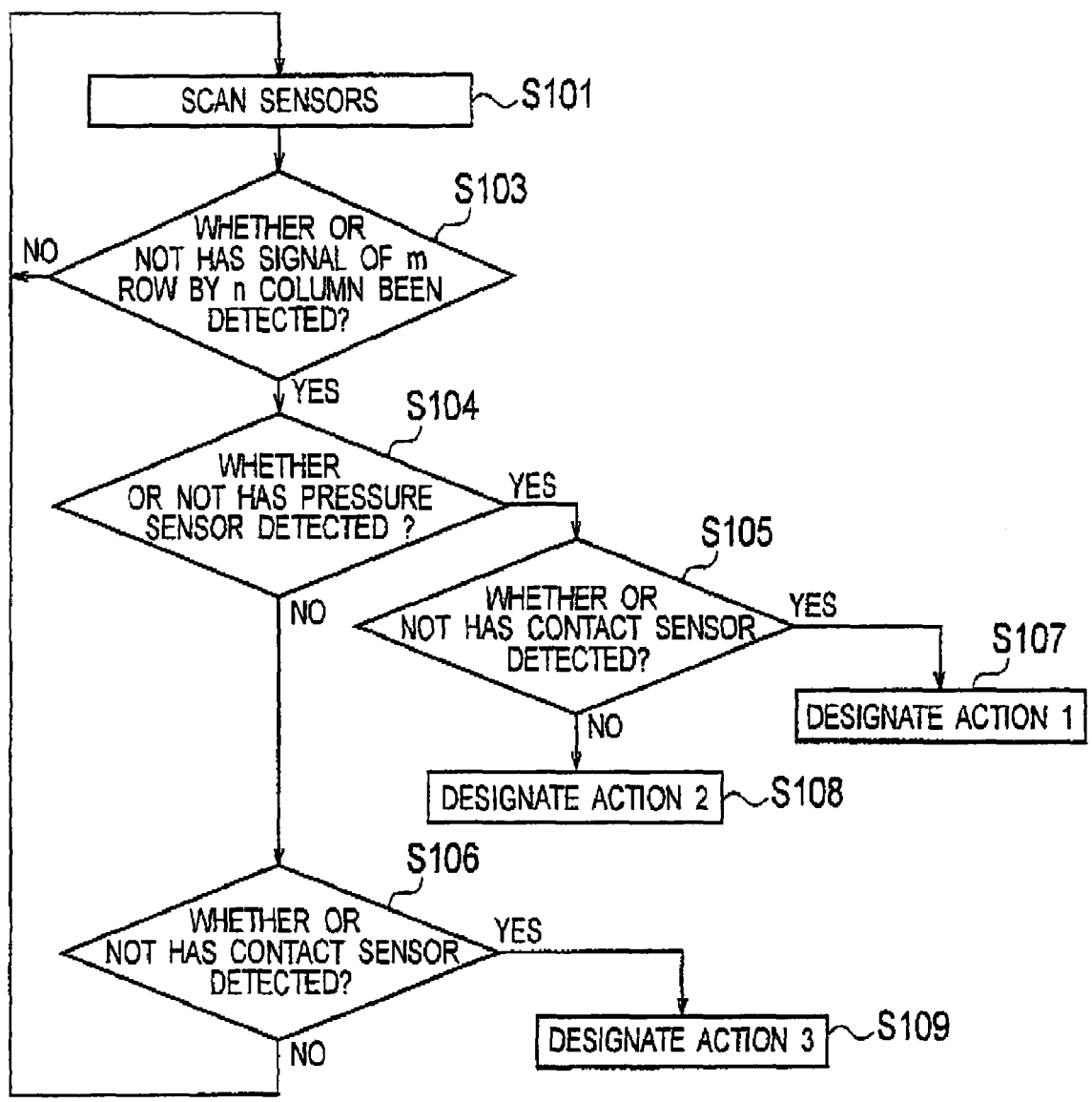
FIG. 13 is a flowchart for showing operations of an input device of an embodiment.

It should be noted that in FIG. 13, a process of detection by the contact sensor A is performed after a process of detection by the pressure sensor B is performed. However, the order is not limited to this. A process of detection by the contact sensor A may be performed first, or processes of detections by both the contact sensor A and the pressure sensor B may be performed at the same time.

Next, an operation in the case where the touch sensor 100 is disposed on a numeric keypad, e.g. an operation in the case of a constitution shown in FIG. 4, is described with reference to FIG. 14.

First, in Step S201, when an input operation is performed using a numeric keypad of an input unit 210, key information corresponding to the input operation is transmitted to the CPU 130. Then, in Step S202, the CPU 130 performs a process corresponding to an input operation using the numeric keypad.

Subsequently, in Step S203, the CPU 130 determines whether or not the sheet-like touch sensor 100 is active. The CPU 130 determines whether or not the touch sensor 100 is active according to a switch provided to an input device, a selection on software operated through a screen, or the like. Alternatively, the sheet-like touch sensor 100 may be turned active when an input operation using the numeric keypad is completed. In the case where the touch sensor 100 is active, the process goes to Step S204. As a case where the touch sensor 100 is not turned active, there is a case where the user intends to use only a numeric keypad for the purpose of preventing a malfunction.

A process in Step S204 is substantially the same as that in Step S101 of FIG. 13. Therefore description thereof is omitted.

Next, in Step S205, the memory manager 132 stores a result of scanning performed by the X-axis output unit 110a and the Y-axis scanner 110b in the memory 140. Then the memory manager 132 compares the scanning result with a memory value stored last time. In the case where the scanning result is different from the memory value, the memory manager 132 determines that the sensor has detected a displacement.

Processes in Steps S206 to S212 are substantially the same as those in Steps S103 to S109 of FIG. 13. Therefore descriptions thereof are omitted.

Figure 15:
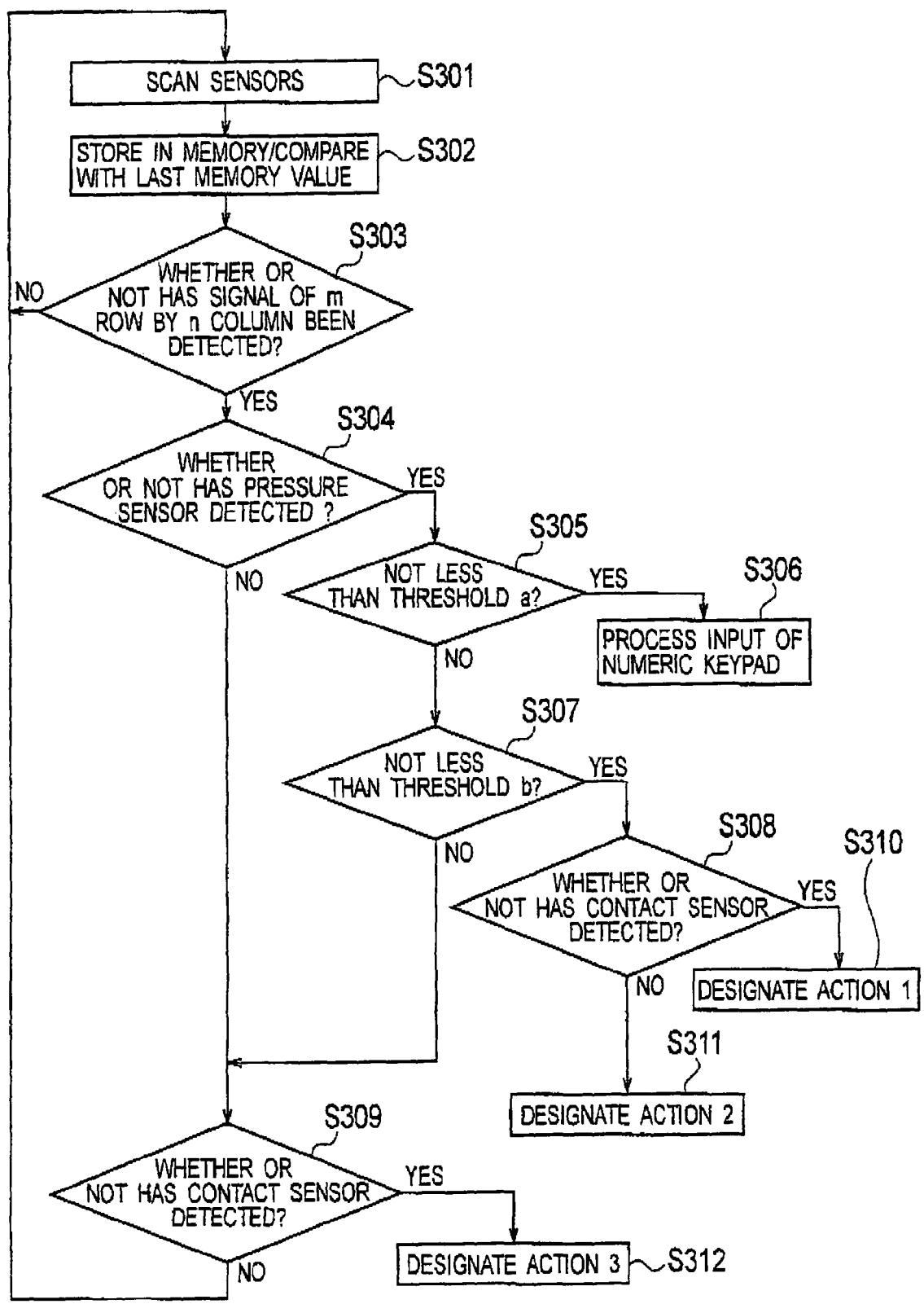
FIG. 15 is a flowchart for showing operations of the input device of the embodiment.

Next, an operation in the case where the touch sensor 100 also functions as a numeric keypad to be inputted, e.g. an operation shown in FIG. 5B, is described with reference to FIG. 15. Incidentally, it is assumed that the following condition be satisfied: a threshold a>a threshold b in FIG. 15.

Figure 14:
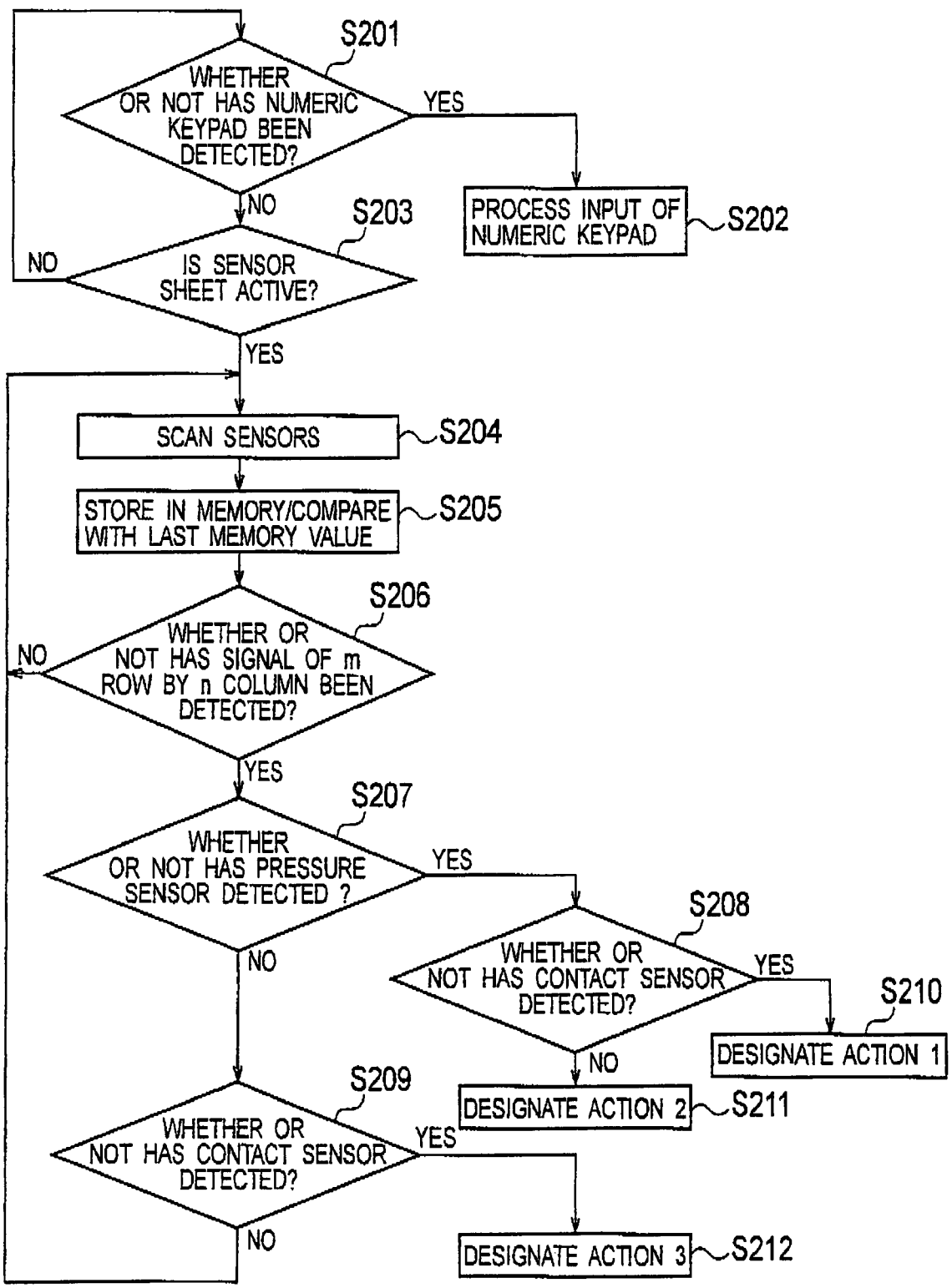
FIG. 14 is a flowchart for showing operations of the input device of the embodiment.

Processes in Steps S301 to S304 are substantially the same as those in Steps S204 to S207 of FIG. 14. Therefore descriptions thereof are omitted.

In Step S305, the CPU 130 determines whether or not a pressure sensor B has detected a depression at pressure or time being not less than the threshold a. When a depression is detected at pressure or time being not less than the threshold a, the process goes to Step S306 and an input process of a numeric keypad is performed.

In Step S307, the CPU 130 determines whether or not a pressure sensor B has detected a depression at pressure or time being not less than the threshold b. When a depression is detected at pressure or time being not less than the threshold b, it is determined that the process is a depression process, not an input process of the numeric keypad.

Processes in Steps S308 to S312 are substantially the same as those in Steps S208 to S212 of FIG. 14, therefore descriptions thereof are omitted (Advantages and Effects)

According to the touch sensor 100, the touch pad 150 and the input device 200 of the present embodiment, contact sensors A, configured to detect a change in an electric potential when an object contacts the surface, and pressure sensors B, configured to detect a change in a pressure when an object depresses the surface, are provided. Accordingly, both of a movement on an x-y plane and a depression in the direction of z-axis can be detected by solely using a touch pad.

As described above, since a three dimensional (x-y-z) input is made possible, discrimination between dragging and moving a cursor can be achieved using solely a piece of sheet, by detecting a difference in pressures on a touch pad. In addition, the present invention can be applied to a complicated operation such as dragging and dropping. Moreover, the present invention can be applied to an expression using pen pressure such as a calligraphic input. Furthermore, it is possible to make different signal inputs depending on pressing pressures, therefore various signals can be inputted by using solely a piece of sheet.

In addition, organic transistors are used as switching elements of the contact sensor A and the pressure sensor B. Accordingly, it is possible to process on extremely thin sheets, thus producing advantages that they are light and are unlikely to be broken.

Moreover, according to the input device 200 of the present embodiment, a position in which a contact sensor A detects a displacement and a position in which a pressure sensor B detects a displacement correspond to keys, respectively. For this reason, information corresponding to the keys can be outputted to the display 220.

Furthermore, the input device 200 may include the input unit 210 where a plurality of keys is disposed, and the contact sensors A and the pressure sensors B may be disposed on the input unit 210. By disposing the sensors on the input unit 210 in this manner, the present invention can be applied to a small-sized input device having little extra space.

In addition, in the input device 200, the contact sensors A and the pressure sensors B may be disposed on the display 220. By disposing the sensors on the display 220 in this manner, the present invention can be applied to a small-sized input device having little extra space.

Moreover, the input device 200 includes the elastic body 1 which is disposed so as to correspond to the plurality of keys. For this reason, a feeling of click can be retained for a user.

OTHER EMBODIMENT

Although the present invention has been described by using the above-described embodiments, it should not be understood that the description and drawings that configure part of this disclosure are to limit the present invention. From the above-described disclosure, various alternative embodiments, examples and operational techniques will be obvious to those skilled in the art.

For example, in the above-described embodiments, an organic transistor has been taken as the example of a switching element. However, a transistor made of inorganic materials may be used instead. In addition, a structure of the organic transistor is not limited to those of the above-described embodiments, and may be a metal-insulator-semiconductor (MIS) structure or a static induction transistor (SIT) structure. However, when making a sensor device requiring flexibility, as in the case of placing a sensor so as to overlap a numeric keypad, it is preferable to use an organic transistor capable of being formed in a low-temperature process, the temperature of which is not greater than an allowable temperature limit of a plastic substrate, e.g. 180° C. or less. By using such an organic transistor, it is possible to form a sensor device on a plastic sheet to which a high-temperature process (not less than 300° C.) for manufacturing amorphous silicon and polysilicon cannot be applied. Moreover, by using an organic transistor, it is possible to manufacture devices at low cost since the transistor can be formed using a process in high speed and large area such as a printing or an ink jet method.

As described above, it is needless to say that the present invention includes various embodiments which are not described in this description. Accordingly, the technical scope of the present invention is defined by only the scope of the claims that appear appropriate from the above description.

What is claimed is:

1. A touch sensor
   a contact sensor, including a first electrode and a first switching element connected to the first electrode, configured to detect a change in an electric potential when an object contacts a surface;
   a pressure sensor, including a second electrode and a second switching element connected to the second electrode, configured to detect a change in a pressure when an object depresses the surface and,
   a piezoelectric provided on the first switching element and the second switching element, wherein
   the first electrode is provided on the piezoelectric and is connected to the first switching element through a contact part in a contact hole formed in the piezoelectric, and
   the second electrode is provide under the piezoelectric and
   a plurality of the contact sensors and a plurality of the pressure sensors are disposed regularly in an array.

2. The touch sensor according to claim 1, wherein each of the first switching element and the second switching element in an organic transitor, respectively.

3. A touch pad comprising:
   a contact sensor, including a first electrode and a first switching element connected to the first electrode, configured to detect a change in an electric potential when an object contacts a surface; and
   a pressure sensor, including a second electrode and a second switching element connected to the second electrode, configured to detect a change in a pressure when an object depresses the surface and,
   a piezoelectric provided on the first switching element and the second switching element, wherein
   the first electrode is provided on the piezoelectric and is connected to the first switching element through a contact part in a contact hole formed in the piezoelectric, and
   the second electrode is provide under the piezoelectric, and
   a plurality of the contact sensors and a plurality of the pressure sensors are disposed regularly in an array, and
   a CPU configured to generate a control signal based on a signal outputted from the touch sensor; and to send the control signal to an external device.

4. An input device comprising:
   a contact sensor, including a first electrode and a first switching element connected to the first electrode, configured to detect a change in an electric potential when an object contacts a surface; and
   a pressure sensor, including a second electrode and a second switching element connected to the second electrode, configured to detect a change in a pressure when an object depresses the surface and,
   a piezoelectric provided on the first switching element and the second switching element, wherein
   the first electrode is provided on the piezoelectric and is connected to the first switching element through a contact part in a contact hole formed in the piezoelectric, and
   the second electrode is provide under the piezoelectric and
   a plurality of the contact sensors and a plurality of the pressure sensors are disposed regularly in an array,
   a CPU configured to generate a control signal based on a signal outputted from the touch sensor; and to send the control signal to an external device, and
   a display configured to output information in response to the control signal, the information corresponding to the position detected by the contact sensor, or corresponding to the position detected by the pressure sensor.

5. The input device according to claim 4, wherein the position detected by the contact sensor and the position detected by the pressure sensor correspond to keys, respectively.

6. The input device according to claim 4, further comprising an input unit in which a plurality of keys are disposed, wherein
   the contact sensor and the pressure sensor are disposed on the input unit.

7. The input device according to claim 6, further comprising an elastic member which is disposed corresponding to the plurality of keys.

8. The input device according to claim 4, wherein the contact sensor and the pressure sensor are disposed on the display.

9. The touch sensor according to claim 1, wherein the pressure sensor further comprises a third electrode provided on a top surface of the piezoelectric opposing the second electrode.

10. The touch pad according to claim 3, wherein the pressure sensor further comprises a third electrode provided on a top surface of the piezoelectric opposing the second electrode.

11. The input device according to claim 4, wherein the pressure sensor further comprises a third electrode provided on a top surface of the piezoelectric opposing the second electrode.

* * * * *